Figure 1:
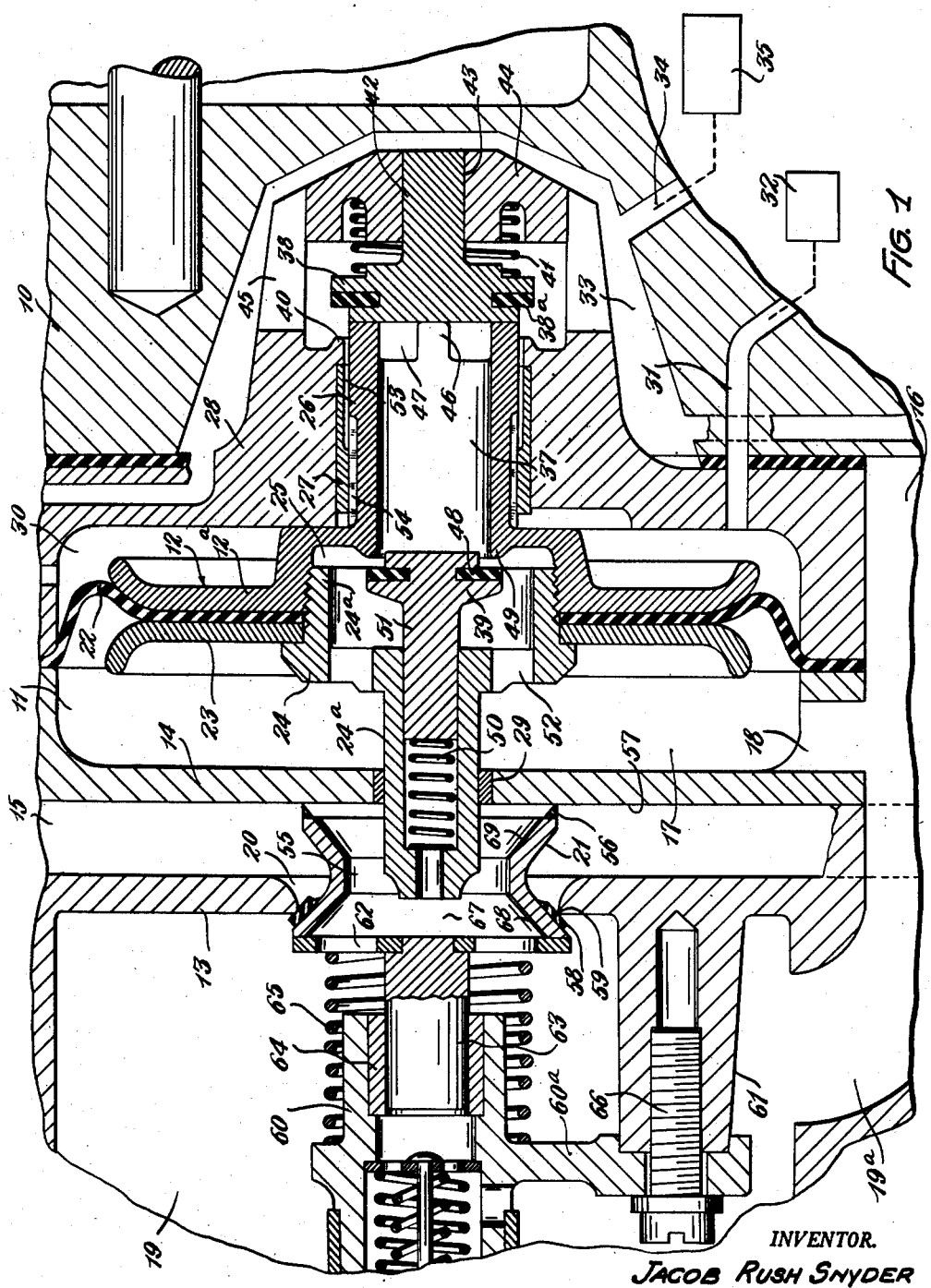

March 8, 1955   J. R. SNYDER   2,703,734
BALANCED EMERGENCY VENT VALVE
Filed Oct. 28, 1949   2 Sheets-Sheet 1

INVENTOR.
JACOB RUSH SNYDER
BY Hudson, Boughton,
Williams, David & Hoffmann.
ATTORNEYS

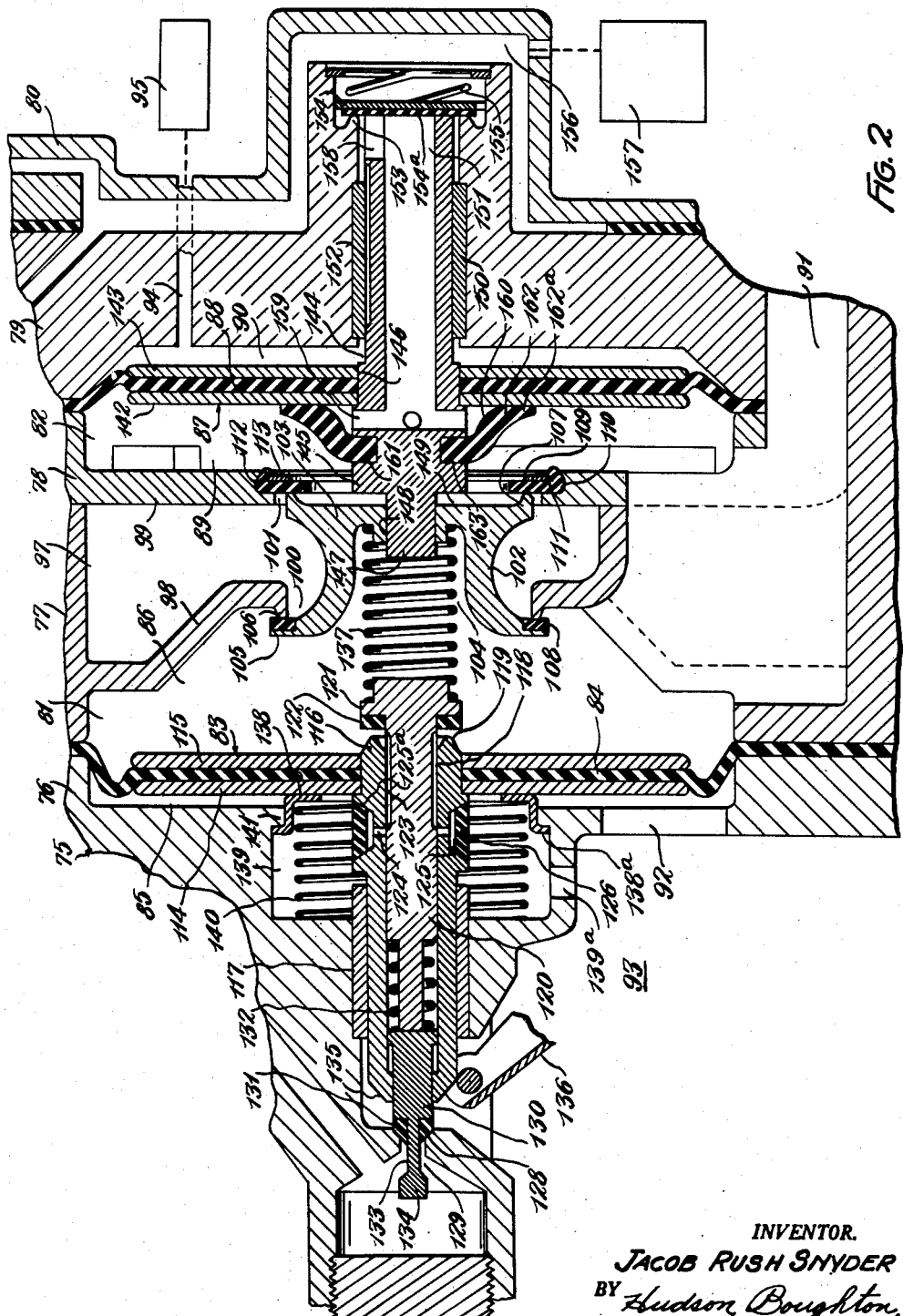

United States Patent Office 2,703,734
Patented Mar. 8, 1955

BEST AVAILABLE COPY 2,703,734

BALANCED EMERGENCY VENT VALVE

Jacob Rush Snyder, Cleveland, Ohio

Application October 28, 1949, Serial No. 124,028

29 Claims. (Cl. 303—39)

This invention relates to air brake apparatus and, more particularly, to the control valve mechanism thereof and provides an improved construction for the emergency vent valve and the parts of the control valve mechanism associated therewith. This application is a continuation-in-part of my earlier application Serial No. 98,063, filed June 9, 1949.

As one of its objects, this invention provides improved vent valve means for a control valve mechanism in which the vent passage is controlled by a balanced valve requiring only a small amount of force for the opening thereof and for maintaining the same in its open position.

Another object is to provide an improved vent valve means for venting the brake pipe, or the brake pipe chamber of the control valve mechanism, to atmosphere and in which a balanced valve controlling the vent passage is adapted to be opened in a positive and effective manner by a piston responding to brake pipe pressure reduction.

A further object is to provide an improved emergency venting means for a control valve mechanism in which a balanced emergency vent valve located adjacent the emergency piston and adapted to be actuated thereby is of a substantially hourglass or hyperboloid shape and has annular seating portions engageable with spaced walls of the control valve mechanism when the balanced valve is in its closed position.

Still another object is to provide an improved venting means in which a balanced valve and a pair of spaced walls with which it cooperates have cooperating paired seating elements thereon and in which one of the seating elements of each pair is yieldable in character, preferably by being made of a resiliently flexible material so as to insure proper seating of the balanced valve simultaneously against both walls when the valve is in its closed position.

Yet another object is to provide improved vent valve means in which a vent chamber or passage located between the service and emergency pistons of a control valve mechanism has spaced walls carrying annular valve seats with which opposite end portions of a balanced emergency vent valve cooperate and in which the balanced vent valve is adapted to be opened by the emergency piston in opposition to spring means disposed between the balanced valve and the service piston.

This invention also provides improved air brake apparatus in which a balanced emergency vent valve associated with the emergency piston of a control valve mechanism and another valve associated with the service piston of the control valve mechanism are both held in their closed position by a common spring means.

It is also an object of the present invention to provide improved air brake apparatus in which a piston of a control valve mechanism is provided with novel check valve means for a relief flow of pressure from one side of the piston to the other.

As a further object, this invention provides improved air brake apparatus in which a check valve member carried by one of the pistons of a control valve mechanism is formed of yieldable material and has an annular lip sealingly pressed against a portion of the piston.

The invention can be further briefly summarized as consisting in certain novel combinations and arrangements of parts hereinafter described and particularly set out in the claims hereof.

In the accompanying sheets of drawings,

Fig. 1 is a partial longitudinal section taken through the emergency piston and emergency vent valve of an air brake control valve mechanism embodying the present invention; and Fig. 2 is a partial longitudinal section taken through the service and emergency pistons and the emergency vent valve of another air brake control valve mechanism embodying the present invention.

In the air brake apparatus of Fig. 1 a portion of the housing 10 of a control valve mechanism is shown and has an emergency piston chamber 11 therein in which an emergency piston 12 is operable. The housing 10 has a pair of spaced walls 13 and 14 therein defining therebetween a vent chamber or passage 15 which communicates with the atmosphere. The housing 10 also has a brake pipe chamber 16 therein with which the brake pipe (not shown), of the car on which this apparatus is located, is in direct communication. The brake pipe chamber 16 includes the compartment 17 of the emergency piston chamber 11 and is in direct communication therewith through the passage 18. The brake pipe chamber 16 also includes a compartment 19 located on the outer or remote side of the wall 13 and is in direct communication therewith through the passage 19a. The wall 13 is provided with an opening 20 which connects the compartment 19 with the vent chamber 15 and is controlled by a balanced vent valve 21 which will be further described hereinafter.

The vent valve mechanism of Fig. 1 and the air brake apparatus associated therewith is substantially identical with a portion of the air brake apparatus disclosed in my copending patent application identified above.

The emergency piston 12 is here shown as being of the diaphragm type and comprises a piston body 12a, a flexible diaphragm 22 and a clamping member or disk 23. The disk 23 is held in clamping cooperation with the piston body 12a by means of a nut member 24 having a threaded sleeve portion 24a screwed into an internally threaded central chamber 25 of the piston body. The piston body 12a is provided on one side thereof with an axial hollow stem 26 which is slidable in a bushing 27 mounted in the housing member 28. The nut member 24 has an axial stem 24a which extends in coaxial alignment with, but in the opposite direction to, the stem 26 and is slidable in a bushing 29 carried by the wall 14.

The emergency piston 12 divides the emergency piston chamber 11 into the above-mentioned compartment 17 and a compartment 30. The compartment 30 is continuously in communication, through passage 31, with a pressure-charged control chamber provided in the housing 10 but here represented diagrammatically by the rectangle 32. The housing 10 also contains a pressure-charged space or chamber 33 which is continuously in communication, through the passage 34, with a supply reservoir which is here represented diagrammatically by the rectangle 35.

The hollow stem 26 of the piston 12 provides a passage 37 through which pressure fluid can be discharged or returned from the supply reservoir 35 into the compartment 17 and the brake pipe chamber 16, as for a brake-releasing function, and which communication is controlled by a valve member 38 and a check valve 39. The passage 37 also serves as a relief passage for the release of pressure into the compartment 17 from the compartment 30 and the control chamber 32. The housing member 28 is provided with an annular valve seat 40 disposed in surrounding relation to the hollow piston stem 26 and against which the sealing washer 38a of the valve member 38 is normally held by the spring 41. The valve member 38 has an axial guide stem 42 thereon which is slidable in an opening 43 of a bearing member 44. This bearing member is supported as by means of a group of axial finger portions 45 of the housing member 28. The valve member 38 is adapted to be unseated by the piston stem 26 which is provided at its outer end with finger portions 46 and with intervening spaces 47 through which pressure fluid enters the passage 37 from the space or chamber 33.

The check valve 39 carries a sealing washer 48 which is engageable with a valve seat 49 located in the piston chamber 25 and is adapted to be held thereagainst by a compression spring 50 acting on this valve and located in the hollw stem 24a of the nut member 24. The check valve 39 has an axial stem projection 51 thereon which is slidable in the passage of the hollow stem 24a and is engaged by the compression spring 50. The nut member 24 has openings 52 therein by which the chamber 25 of the emergency piston is in direct communication with the compartment 17 and the brake pipe chamber 16.

To permit the controlled escape of air pressure from the compartment 37, a restricted communication 30 and the control chamber 32 to the compartment 17 through the openings 47 and the passage is provided between the piston stem 26 and the bushing 27. This restricted communication is formed by the counterbore 53 of the bushing 27 and one or more axial grooves 54 provided in the outer surface of the stem 26. The grooves 54 are in communication with the counterbore 53 when the emergency piston 12 is in the position shown in Fig. 1 which is its extreme right-hand position corresponding with the released condition of the brake. When an emergency reduction in brake pipe pressure is made the movement of the emergency piston toward the left causes the grooves 54 to become disconnected from the counterbore 53, as is explained in greater detail in said copending original application, whereupon the pressure of the control chamber 32 will be effective in the compartment 30 to suddenly shift the piston toward the left and open the vent valve 21. During the time that the grooves 54 are disconnected from the counterbore 53, the communication between the compartment 30 and the passage 37 takes place through the small clearance space or tolerance between the stem 26 and the bushing 27 and, since this is a restricted communication, the pressure in the compartment 30 will be effective in maintaining the vent valve 21 open for a desired period of time before the pressure in this compartment leaks down. During service reductions in brake pipe pressure, the movement of the emergency piston 12 is insufficient to disconnect the grooves 54 from the counterbore 53 and, hence, at this time the pressure of the control chamber 32 will escape through the passage 37 by way of the grooves 54 and the openings 47 quickly enough to prevent such pressure from producing an undesired emergency actuation of the piston.

The emergency vent valve 21 is a balanced valve, as mentioned above, and comprises a hollow body of a substantially hourglass or hyperboloid shape. In this instance the valve 21 has a passage 55 extending therethrough. The valve 21 is provided at one end thereof with an annular seating portion 56 which is engageable with a valve seat 57 formed by the flat surface of the wall 14. Adjacent its other end the valve 21 is provided with an annular seating portion 58 which is engageable with an annular valve seat 59 formed on the wall 13 and extending around the opening 20. The seating portions 56 and 58 of the valve 21 are here shown as being both formed of a flexible or yieldable material, such as rings of soft vulcanized rubber bonded to the valve, so that a good seal will be made simultaneously with the valve seats 57 and 59 by these seating portions when the valve is in its closed position.

The vent valve 21 extends into or part way into the vent chamber 15 through the opening 20 of the wall 13 and is disposed in coaxial relation to the emergency piston 12. The vent valve is supported in this relation by means of a bracket 60 carried by projections 61 of the wall 13. For this purpose the valve 21 is provided with a spider 62 at its outer end and a guide stem 63 which is connected with this spider and is slidable in a bushing 64 mounted in the bracket 60. A compression spring 65 disposed around the guide stem 63 and seating against the bracket 60 also engages the spider 62 for urging the valve 21 toward its closed position. The bracket 60 is mounted on the projections 61 of the wall 13 by means of radial arms 60a which are clamped against the projections by screws 66.

When the balanced vent valve 21 is in its closed position and the emergency piston 12 is in its fully retracted position, as shown in Fig. 1, the outer end of the stem 24a is spaced a short distance from the spider 62, as indicated by the space 67, to thereby provide a lost-motion operating connection between the emergency piston and the balanced vent valve. The space 67 permits limited movements of the emergency piston 12 to take place during the occurrence of service reductions in brake pipe pressure without causing opening of the emergency vent valve.

When an emergency reduction in brake pipe pressure is made, however, a sudden movement of the piston 12 takes place toward the left for its full travel, causing the stem 24a to traverse the space 67 and engage the spider 62 to thereby open the vent valve 21. When the seating portions 56 and 58 of the vent valve are thereby separated from the valve seats 57 and 59 of the walls 14 and 13, pressure in the brake pipe chamber 16 is immediately released into the vent chamber 15. A portion of this brake pipe pressure flows from the compartment 19 through the passage 20 and another portion flows through the passage 55 of the vent valve and then into the vent chamber 15 through the space between the valve seat 57 and the seating portion 56 which has been separated therefrom.

As shown in Fig. 1, the vent valve 21 has oppositely inclined internal annular portions 68 and 69 which are of substantially the same area. The effect of the brake pipe pressure acting on these areas is to produce two substantially equal and opposite forces which tend to move the valve in opposite directions and hence neutralize or cancel out each other, with the result that the valve is always in a pressure-balanced condition and can be moved to its open position substantially without opposition by the brake pipe pressure and with an expenditure of only the amount of force needed to overcome friction and the compression spring 65.

In describing the operation of the air brake mechanism of Fig. 1, it should be first explained that the emergency piston 12 is shown in the position corresponding with the releasing and recharging condition of the brake. At this time pressure is being supplied to the brake pipe by the locomotive and has caused the piston to be shifted to its extreme right hand position, thereby opening the valve 38 to permit air to be dumped back into the brake pipe by the supply reservoir 35 to assist in the releasing function. This return flow of air from the supply reservoir takes place through the passage 34, the chamber 33, openings 47, passage 37 and then past the check valve 39 and through the openings 52 into the compartment 17.

At this time the extent of overlap of the grooves 54 with respect to the counterbore 53 is such as to provide the maximum flow capacity for this restricted communication and some of the air being returned by the supply reservoir 35 flows through this communication into the compartment 30 and thence into the control chamber 32 through the passage 31, thereby charging this compartment and the control chamber. As the pressures in compartments 30 and 17 become equalized, the spring 41 closes the valve 38 and causes the piston 12 to assume an intermediate or initial position in which the space 67 is reduced in width and the extent to which the grooves 54 overlap the counterbore 53 is reduced.

When only a service reduction in brake pipe pressure is made the movement of the emergency piston is insufficient to unseat the vent valve 21. During such a service reduction the pressure in the compartment 30 and in the control chamber 32 is relieved by flowing through the restricted communication provided by the grooves 54 and this pressure is thus dissipated and prevented from causing an undesired emergency actuation of the piston 12. The pressure fluid being thus relieved flows through the openings 47, the passage 37, past the check valve 39 and through the openings 52 into the compartment 17 and thence into the brake pipe chamber 16 through the passage 18.

When an emergency reduction in brake pipe pressure is made, a sudden drop occurs in the pressure of the compartment 17 permitting the pressure of the control chamber 32 and the compartment 30 to shift the piston 12 rapidly to the left for its full travel, thereby taking up the space 67 and causing the stem 24a to engage and open the balanced vent valve 21 for the accomplishment of the venting function explained above. When such an emergency reduction is made, the pressure in the control chamber 32 and in the compartment 30 cannot escape rapidly enough through the restricted communication provided by the grooves 54 to prevent the control chamber pressure from being effective on the piston 12 and, hence, this pressure causes the rapid actuation of the piston to the left, as just mentioned above, to cause opening of the vent valve 21. This movement of the piston 12 to the left also causes the grooves 54 to be disconnected from the counterbore 53, thereby further restricting the relief passage to the flow capacity of small clearance space or tolerance between the stem 26 and the bushing 27 with the result that the drop in control chamber pressure will be sufficiently retarded to cause the vent valve 21 to be maintained open for the period of time necessary to vent the brake pipe. By the time that the control chamber pressure has leaked down through this restricted communication, the brake pipe will have been vented through the vent chamber 15 and the spring 65 will reclose the vent valve 21.

Fig. 2 of the drawings shows control valve mechanism and vent valve means which is similar in principle to that of Fig. 1 but is somewhat more simplified and is an improvement thereover. In this modified construction of Fig. 2 a housing 75 of the control valve mechanism is shown as having connected sections 76, 77, 78, 79 and 80 and as having service and emergency piston chambers 81 and 82 therein. The service piston chamber 81 has a service piston 83 operable therein which includes a flexible diaphragm 84 secured between the casing sections 76 and 77 and dividing the piston chamber 81 into the compartments 85 and 86. Similarly, an emergency piston 87 is provided in the emergency piston chamber 82 and includes a flexible diaphragm 88 which is secured between the housing sections 78 and 79 and divides the emergency piston chamber into the compartments 89 and 90.

The housing 75 of this control valve mechanism also includes a brake pipe chamber 91 which is in direct communication with the brake pipe of the train and is also directly connected with the compartment 86 of the service piston chamber 81 and the compartment 89 of the emergency piston chamber 82 such that these compartments constitute portions of the brake pipe chamber. The compartment 85 of the service piston chamber 81 is directly connected by a passage 92 with the pressure space 93 located to the left of the housing section 76 and which is the pressure space of the auxiliary reservoir. The compartment 90 of the emergency piston chamber 82 is in direct communication, through a passage 94, with a control chamber 95 which is provided in the housing 75 but is here represented only diagrammatically by a rectangle.

The housing 75 also includes a vent chamber 97 which is defined between walls 98 and 99 of the housing sections 77 and 78 and is directly connected with the atmosphere. This vent chamber is thus located between the service and emergency piston chambers 81 and 82 and is adapted to be connected with the compartment 86 through an opening 100 of the wall 98 and with the compartment 89 through an opening 101 of the wall 99. The openings 100 and 101 are the emergency vent openings through which brake pipe pressure can be rapidly vented to the atmosphere and are controlled by a balanced emergency vent valve 102.

The vent valve 102 is a cup-shaped hollow structure whose exterior surface has substantially the form of an hourglass or a hyperboloid of revolution. The body forming the valve 102 includes a transverse wall 103 at one end thereof and a cup-shaped recess 104 extending into the body from its opposite end. The valve 102 is provided with an annular seating portion 105 at one end thereof for cooperation with an annular valve seat 106 provided on the wall 98 and extending around the opening 100. The opposite end of the valve 102 is provided with an annular seating portion 107 for cooperation with the wall 99.

The seating portion 105 which cooperates with the annular valve seat 106 comprises or includes a sealing ring 108 of yieldable material. The portion of the wall 99 with which the seating portion 107 of the valve 102 cooperates is a valve seat 109 which is made in the form of a sealing ring or lip of resilient or flexible material which is carried by the wall 99 and extends around the opening 101. The sealing rings 108 and 109 can be made of soft-vulcanized rubber or any other material suitable for this purpose. The sealing ring 109 includes a peripheral flange portion 110 having an internal gloove 111 therein and which flange portion is engaged in an undercut annular groove 112 formed in the edge portion of the wall 99 which defines the opening 101. The sealing ring 109 is mounted on the wall 99 by having its peripheral flange portion 110 seated in the groove 112 and retained therein by a spring ring 113 of the expansible snap-in type.

The balanced valve 102 is disposed in coaxial relation to the pistons 83 and 87 and the aligned openings 100 and 101 and extends into the exhaust chamber 97 through the opening 100. When the valve is in its closed position the seating portion formed by the sealing ring 108 engages the valve seat 106 and the seating portion 107 engages the valve seat formed by the sealing ring 109. Since the seating portion 108 and the valve seat 109 are made of yieldable material, a tight seal will be formed simultaneously at both of these points when the valve is in its closed position. From the shape of the valve 102 it will be observed that the brake pipe pressure in the compartments 81 and 82 acts on opposite sides of the valve and in opposite directions and hence the valve will be pressure-balanced and its opening movement will be substantially unopposed by brake pipe pressure and can be quickly accomplished with only a small actuating force.

Reverting now to the service piston 83 it will be observed that in addition to the diaphragm 84 this piston comprises a pair of metal plates or disks 114 and 115 disposed on opposite sides of the diaphragm and a hollow piston stem 116 on which these disks are mounted. The piston 83 is guided in its movements by a bushing 117 which is mounted in the housing member 76 and in which the piston stem 116 is slidable. The piston stem 116 is provided with an axial passage 118 and carries a valve seat 119 which extends around the inner end of this passage. A valve stem 120 is slidable in the passage 118 of the piston stem and at its inner end carries a valve member 121 having thereon a sealing washer 122 which is engageable with the valve seat 119.

A portion of the valve stem 120 which is located adjacent the valve 121 is of a reduced size so as to provide an air passage 123 which is in communication with the compartment 81 when the valve 121 is in its open position. The passage 123 is also in communication with a plurality of radial ports 124 provided in the piston stem 116 and which connect the passage 123 with the bottom of an annular groove 125 extending around the piston stem and formed therein. The passage 123 and the ports 124 provide a feed passage through which air pressure supplied by the brake pipe can be delivered into the auxiliary reservoir space 93 for charging the same. The connection of the ports 124 with the auxiliary reservoir space 93 is controlled by a check valve in the form of a ring 126 extending around the piston stem 116 and lying in the groove 125. The ring 126 is formed of an elastic or resiliently flexible material, such as soft vulcanized rubber, and has convergently tapered side edges which seat against side walls 125a of the grooves 125 which have a corresponding taper.

Associated with the service piston 83 is a valve seat 128 formed on the housing section 76 in coaxial alignment with the piston stem 116 and which extends around a passage 129 through which pressure fluid can be supplied from the auxiliary space 93 to a relay valve mechanism (not shown) for causing the brake to be applied in response to actuation of the service piston. A plunger 130 which is axially slidable in the hollow piston stem 116 projects therefrom and carries a valve member 131 which is normally held in engagement with the seat 128 by a spring 132 located in the piston stem. The plunger 130 can be formed as an integral part of the valve stem 120 but, preferably and as here shown, is a separate part of the spring 132 disposed between this plunger and the valve stem 120.

The plunger 130 may also include a stem portion 133 which extends through the passage or port 129 and carries a head or valve member 134, as explained in said copending original application. The element 134 serves to restrict the passage 129 during a certain portion of the emergency functioning of this air brake apparatus. The outer end of the piston stem 116 is here shown as being provided with a bevel or cam surface 135 for cooperation with a lever 136 through which the service piston 83 causes actuation of other valve mechanism which is described in said original application but with which the present invention is not concerned.

The valve 131 is also held against the seat 128 by the action of a spring 137 which acts through the valve stem 120 and the plunger 130. The spring 137 is a dual purpose spring, and, in addition to its action on the valve stem 120, it also acts on the balanced emergency vent valve 102 for urging this valve toward its closed position. One end of the spring 137 is seated in the recess 104 of the valve 102 and its other end is seated on the inner end of the valve stem 120. When the piston 83 is shifted toward the right from the position shown in Fig. 2 so as to cause the valve seat 119 to engage and pick up the valve member 121, the spring 137 then also serves to hold the packing washer 122 in sealing engagement with this valve seat.

The housing 75 is provided with a yieldable stop for limiting the movement of the service piston 83 toward the released position in which it is shown in Fig. 2. This yieldable stop is formed by a ring 138 located in a recess 139 of the housing section 76 and a compression spring 140 also located in this recess and engaging this ring. The ring 138 projects from the recess 139 for engagement by the piston 83 and is normally held in such projected relation by the spring 140. Radial fingers 138a formed on the ring 138 engage behind the retaining shoulder 141 provided on the housing section 76 around the open end of the recess 139 for retaining the ring in connected relation with this housing section. The recess 139 is continuously in communication with the auxiliary reservoir space 93 through the passage 139a.

In addition to the diaphragm 88 the emergency piston 87 is formed by a pair of plates or disk members 142 and 143 disposed on opposite sides of the diaphragm and a piston stem 144 on which these disk members are mounted. The stem 144 has a head portion 145 located on one side of the piston and a shoulder portion 146 adjacent the head and on which the disk members 142 and 143 are secured as by means of a press fit. The head 145 carries an axial extension portion or guide pin 147 on which the balanced emergency vent valve 102 is slidably mounted. The valve 102 is mounted on the pin 147 by having an axial opening 148 substantially centrally of the end wall 103 and in which opening the guide pin 147 engages. A clearance space 149 is provided between the head 145 and the vent valve 102 so as as permit a desired axial movement of the emergency piston 87 without causing opening of the vent valve. Movement of the emergency piston in the piston chamber 82 is guided by the slidable engagement of the piston stem 144 in a bushing 150 mounted in the housing section 79. The portion of the stem 144 which extends through the bushing 150 has an axial passage 151 therein. This portion of the stem is also provided with an axial groove 152 in the external periphery thereof and which is somewhat longer than the bushing 150. This groove forms a restricted relief passage, as hereinafter explained, and the cooperation of the bushing 150 with the plain annular portions of the stem 144 located immediately adjacent the ends of the groove 152 forms a valve for controlling the flow of air pressure through the groove.

At a point outwardly of the bushing 150, the housing section 79 is provided with an annular valve seat 153 which is normally engaged by a valve member 154 having a disk 154a thereon for sealing engagement with this valve seat. A spring member 155 acts on the valve 154 to normally urge the same into engagement with the valve seat 153. The housing sections 79 and 80 cooperate to define a space or chamber 156 to which pressure is supplied by a supply reservoir 157 which is here represented only diagrammatically by a rectangle. The piston stem 144 is of such length that its outer end is engageable with the valve 154 for opening the same during a certain movement of the piston 87, as explained hereinafter. The end of the stem 144 which engages the valve 154 is provided with an axial slot 158 forming a port or opening through which the groove 152 is connected with the passage 151 while the valve member 154 is in its closed position.

The passage 151 of the piston stem 144 extends through the piston 87, as shown in the drawing, and includes transverse ports or passages 159 which are located on the side of the piston which is nearest to the balanced emergency vent valve 102. This end of the passage 151 is adapted to be connected with the compartment 89 of the emergency piston chamber 82 and is controlled by a check valve member 160 of a very simple but novel construction.

This check valve member 160 comprises an annular body of resiliently flexible material, such as soft-vulcanized rubber, molded to the desired shape. This check valve member is here shown as being a cup-shaped member having a substantially flat transverse end wall 161 and a flared annular skirt 162 having an annular lip 162a of tapering thickness in sealing engagement with the disk member 142 of the emergency piston 87. The check valve member 160 is carried by the piston stem 144 and can be mounted thereon by means of an annular groove 163 in the head 145 in which the flat end wall 161 of the valve member engages. By reason of the resilient character of the flexible skirt 162 of the valve member 160, the tapered annular edge 162a will normally be held in sealing engagement with the disk member 142 of the emergency piston to prevent air pressure in the compartment 89 from entering the passage 151 but will be shiftable away from disk member 142 to permit air pressure to flow from the passage 151 into the compartment 89.

The detailed operation of the control valve mechanism of Fig. 2 and the vent valve means thereof will be explained next. When the valve members and pistons are in the positions shown in Fig. 2, the auxiliary reservoir space 93, the control chamber 95 and the supply reservoir 157 are all charged with air pressure and the brake is in its initial or released position ready for the occurrence of a brake pipe pressure reduction. When a service reduction is made in the pressure of the brake pipe chamber 91 the pressure in the compartments 86 and 89 of the service and emergency piston chambers 81 and 82 is also reduced, whereupon the auxiliary reservoir pressure acting in the compartment 85 shifts the service piston 83 toward the right. This movement of the service piston causes the valve seat 119 to engage the valve member 121 to thereby close the charging passage for the auxiliary reservoir during the first portion of the piston movement. The succeeding portions of the movement of the piston 83 cause the plunger 130 to be picked up by the piston stem 116 to thereby move the valve member 131 away from the valve seat 128 and open the passage 129 for the outward flow of auxiliary reservoir pressure therethrough and for the delivery of such auxiliary reservoir pressure to a relay valve means as disclosed in said original application.

The service reduction in brake pipe pressure also causes a decrease in the pressure of the compartment 89 and the pressure of the control chamber 95 acting on the opposite side of the emergency piston 87 through the compartment 90 causes the emergency piston to be shifted toward the left but the resulting movement of this piston is insufficient to cause opening of the emergency vent valve 102 because of the intervening space 149. The movement of the emergency piston during such a service application is kept to a small amount by reason of the fact that the pressure of the control chamber 95 is released through the groove 152 which has now been shifted to a position in which it is uncovered by the bushing 150.

This permits the pressure of the control chamber 95 to be discharged into the brake pipe chamber 91 through the compartment 89 thereby preventing actuation of the emergency piston 87 to the extent which would cause an undesired emergency application of the brake. This release of the pressure from the control chamber 95 takes place through the passage 94, the compartment 90, the groove 152, port 158, passage 151 through the radial ports 159 and past the check valve member 160 into the compartment 89 and then into the brake pipe chamber.

When an emergency reduction is made in the pressure of the brake pipe and in the brake pipe chamber 91, the service piston 83 is moved suddenly toward the right to cause closing of the valve seat 119 against the valve member 121 and opening of the valve member 131, as explained above, and also causes a simultaneous sudden movement of the emergency piston 87 toward the left. This sudden movement of the emergency piston causes the head 145 to engage the end wall 103 of the emergency vent valve 102, thereby disengaging the seating portions 107 and 108 thereof from the valve seats 109 and 106 and thereby placing the compartments 86 and 89 of the service and emergency piston chambers in direct communication with the vent chamber 97 through the openings 100 and 101.

This opening of the emergency vent valve 102 vents the brake pipe directly to the atmosphere and permits the service and emergency pistons to be shifted to the full extent of their emergency movement to result in an emergency application of the brake. The sudden venting of the compartment 89 of the emergency piston chamber 82 permits the pressure of the control chamber 95 to act on the opposite side of this piston to cause the desired sudden shifting of this piston toward the left, as just explained above.

Movement of the emergency piston toward the left causes the groove 152 of the piston stem to be shifted axially relative to the bushing 150 such that the groove is substantially closed by the bushing. This temporarily prevents the escape of the control chamber pressure to the brake pipe through the passage 151, thereby utilizing the control chamber pressure for maintaining the emergency vent valve 102 in its open position. Gradually, however, the pressure of the control chamber 95 will decrease due to the flow of air through a restricted relief passage formed by the tolerance or working clearance between the stem 144 and the bushing 150 and this decrease in the control chamber pressure will permit a partial return movement of the emergency piston 87 which will allow the spring 137 to reclose the emergency vent valve 102.

During the release of the brake following either a service or an emergency application, pressure is restored in the brake pipe and in the brake pipe chamber by the delivery of air into the brake pipe from the locomotive. This increased brake pipe pressure will cause the emergency piston 87 to be shifted further to the right, whereupon the outer end of the piston stem 144 engages the valve member 154 and shifts the same away from the valve seat 153. This permits air pressure from the supply reservoir 157 to be returned to the brake pipe through the passage 151 and past the check valve member 160 to assist in the release movement of the brake mechanism.

Some of the air being discharged from the supply reservoir 157 also travels through the port 158, the groove 152, the compartment 90 and the passage 94 into the control chamber 95 to charge the same. As the pressure in the control chamber 95 and in the compartment 90 builds up, it balances the pressure in the compartment 89 which permits the piston 87 to return to its initial position and allows the spring 155 to reclose the valve member 154. The increase in pressure in the compartment 86 of the service piston chamber 81 also causes a return movement of the service piston 83 toward the left which causes the valve member 131 to be engaged with the valve seat and also causes the valve seat 119 to move away from the valve member 121 to permit recharging of the auxiliary reservoir space 93 through the passage 118 and the radial ports 124. The brake mechanism is then in a condition of readiness for another cycle of operation.

From the foregoing description and the accompanying drawings it will now be readily understood that this invention provides an improved control valve mechanism of a simplified construction but which is efficient and positive in its actuation. It will also be seen that this invention provides novel vent valve means for a control valve mechanism and also provides a novel pressure-balanced emergency vent valve. In both forms of the pressure balanced emergency vent valve disclosed herein, the opening and closing movements of the balanced valve member are an axial endwise movement thereof and the engagement of the seating elements of the valve member with the seating elements of the spaced walls is an engagement endwise of the valve member. Likewise, it will be seen that the seating elements of the spaced walls both face in one axial direction and the seating elements of the balanced valve member both face in the opposite axial direction. Consequently, the seating elements of the walls are engaged by the seating elements of the balanced valve member by axial endwise movement of the latter in one direction and are substantially simultaneously disengaged by the seating elements of the valve member upon axial endwise movement of the latter in the opposite direction.

Although the improved control valve mechanism and vent valve means thereof are herein disclosed to a somewhat detailed extent, it will be understood, of course, that the present invention should not be considered as being correspondingly limited in scope but includes all changes and modifications coming within the terms of the claims hereof.

Having thus described my invention, I claim:

1. In an air brake vent valve mechanism, a housing structure having a pair of spaced walls and also having a vent chamber between said walls and pressure chamber means on the remote sides of said walls, said walls having openings therein connecting said pressure chamber means with said vent chamber for venting pressure to the latter, and a balanced valve controlling said openings and having annular seating portions engageable with said walls when said valve is in its closed position, said valve being movable to an open position in which said annular seating portions are spaced from said walls for a flow of fluid through said openings from said pressure chamber means into said vent chamber.

2. In an air brake vent valve mechanism, a pair of spaced walls having an air chamber therebetween and at least one of said walls having an opening therein communicating with said chamber, and a balanced valve controlling said opening and extending therethrough into said chamber, said valve comprising an annular body of substantially hourglass shape and having annular seating portions adjacent opposite ends thereof adapted for seating engagement with said walls when said valve is in its closed position, said valve being movable to an open position in which said annular seating portions are spaced from said walls with said opening providing a passage for a flow of fluid therethrough into said chamber.

3. Air brake valve mechanism as defined in claim 2 in which said valve member has an axial length which is greater than the spacing of said walls.

4. In an air brake vent valve mechanism, a structure having a pair of spaced walls and also having a vent chamber between said walls and pressure chamber means on the remote sides of said walls, at least one of said walls having an opening therein connecting said pressure chamber means with said vent chamber for venting pressure to the latter, and a balanced valve controlling said opening and extending therethrough into said vent chamber, said valve comprising an axially movable annular body of substantially hourglass shape and having annular seating portions thereon adjacent its opposite ends adapted for seating engagement with said walls when said valve is in its closed position.

5. In an emergency vent valve mechanism, a housing structure having a pair of spaced walls and also having a vent chamber between said walls and brake pipe pressure chamber means on the remote sides of said walls, said walls having openings therein of an aggregate emergency venting flow capacity and connecting said pressure chamber means with said vent chamber, and a balanced emergency vent valve controlling said openings, and having annular seating portions engageable with said walls when said valve is in its closed position, said valve being movable to an open position in which said annular seating portions are spaced from said walls for a flow of fluid through said openings from said pressure chamber means into said vent chamber.

6. An air brake vent valve mechanism comprising, a hollow structure having therein a vent chamber and brake pipe pressure chambers on opposite sides of said vent chamber, spaced walls in said structure having openings connecting the respective pressure chambers with said vent chamber, valve seats carried by said walls and extending around said openings, and a balanced valve controlling said openings and having opposite sides thereof presented to the pressure of said pressure chambers through said openings, said valve also having a pair of annular seating portions thereon for cooperation with said valve seats and said valve being movable to an open position in which said annular seating portions are spaced from said walls for a flow of fluid through said openings from the respective pressure chambers into said vent chamber.

7. An air brake vent valve mechanism comprising, a hollow structure having therein a vent chamber and brake pipe pressure chambers on opposite sides of said vent chamber, a pair of walls in said structure and located between said pressure chambers and said vent chamber and having substantially aligned openings therein connecting the respective pressure chambers with said vent chamber, a pair of annular valve seats carried by said walls and extending around said openings, and a valve member of substantially hourglass shape extending into said vent chamber through one of said openings and disposed so that opposite sides thereof are presented to the pressure of said pressure chambers, said valve having annular seating portions thereon adjacent its opposite ends and engageable with said seats when said valve is in its closed position.

8. In an air brake vent valve mechanism, a pair of spaced walls having openings therein and a chamber between said walls with which said openings communicate, a pair of annular valve seats facing in the same axial direction carried by said walls and extending around said openings, one of said valve seats being yieldably movable relative to one of said walls, and an axially endwise movable valve member simultaneously controlling both of said openings and having an annular seating portion on one end thereof engageable endwise of the valve member with said one valve seat and a yieldable seating portion on its other end engageable endwise of the valve member with the other of said valve seats.

9. In an air brake vent valve mechanism, a pair of spaced walls having openings therein and a chamber between said walls with which said openings communicate, a pair of annular valve seats facing in the same axial direction carried by said walls and extending around said openings, one of said valve seats being a ring formed of non-metallic yieldable material, and an axially endwise movable valve member simultaneously controlling both of said openings and having an annular seating portion on one end thereof engageable endwise of the valve member with said one valve seat and a seating portion on its other end comprising a ring of non-metallic yieldable material mounted thereon and engageable endwise of the valve member with the other valve seat of said pair.

10. In an emergency vent valve mechanism, a structure having spaced walls with a vent chamber therebetween and also having brake pipe pressure chamber means on the remote sides of said walls, said walls having substantially axially aligned openings of an emergency venting flow capacity therein connecting said pressure chambers with said vent chamber, annular valve seats carried by said walls and extending around said openings, one of said valve seats being yieldable relative to the wall carrying the same, and a movable valve of substantially hourglass shape extending into said vent chamber through one of said openings and having its opposite sides presented to the pressure of said pressure chamber means, said valve having an annular seating portion on one end thereof engageable with said one valve seat and yieldable annular seating means on its other end engageable with the other of said valve seats.

11. In an emergency vent valve mechanism, a structure having spaced walls with a vent chamber therebetween and also having a brake pipe pressure chamber on the remote side of one of said walls, said one wall having an opening therein of an emergency venting flow capacity connecting said pressure chamber with said vent chamber, and a balanced valve of substantially hourglass shape controlling said opening and having seating portions adjacent its opposite ends which are engageable with said walls when said valve is in its closed position, said valve having a passage extending axially therethrough which is continuously in communication with said pressure chamber.

12. In an emergency vent valve mechanism, a structure having spaced walls with a vent chamber therebetween and also having a brake pipe pressure chamber on the remote side of one of said walls, said one wall having an opening therein of an emergency venting flow capacity connecting said pressure chamber with said vent chamber, and a balanced valve of substantially hyperboloid shape extending into said vent chamber through said opening and having seating portions thereon adjacent its opposite ends and engageable with said walls when said valve is in its closed position, said valve being hollow and having a passage extending axially therethrough.

13. In an emergency vent valve mechanism, a structure having spaced walls with a vent chamber therebetween and also having brake pipe pressure chamber means on the remote sides of said walls, said walls having substantially aligned openings therein of an emergency venting flow capacity connecting said pressure chambers with said vent chamber, and a valve extending into said vent chamber through one of said openings and having annular seating portions thereon adjacent its opposite ends and engageable with said walls in surrounding relation to said openings when said valve is in its closed position, said valve comprising a hollow body formed by a wall of substantially hyperboloid shape and a transverse wall closing said body at a point intermediate its ends.

14. In an air brake vent valve mechanism, a housing having walls defining a vent chamber and a brake pipe pressure chamber and including a pair of walls having said vent chamber therebetween and a movable piston means, said housing also having therein a piston chamber in which said piston means is operable and formed in part by a portion of said brake pipe pressure chamber located between said piston means and one of the paired walls, said paired walls having substantially aligned openings therein connecting said brake pipe pressure chamber with said vent chamber and located substantially on the axis of said piston means, a balanced valve controlling said openings, and cooperating stem and thrust surface means providing a lost-motion operating connection for opening actuation of said valve.

15. In an air brake vent valve mechanism, a housing having walls defining a vent chamber and a brake pipe pressure chamber and including a pair of walls having said vent chamber therebetween and a movable piston means, said housing also having therein a piston chamber in which said piston means is operable and formed in part by a portion of said brake pipe pressure chamber located between said piston means and one of the paired walls, said paired walls having substantially aligned openings therein connecting said brake pipe pressure chamber with said vent chamber and located substantially on the axis of said piston means, a balanced valve controlling said openings, said paired walls and the adjacent ends of said balanced valve having paired cooperating annular seating elements thereon and one of the annular seating elements of each pair of said seating elements being yieldable in character, and means providing an operating connection for actuation of said valve by said piston.

16. In an emergency air brake vent valve mechanism, a housing having walls defining a vent chamber and a brake pipe pressure chamber and including a movable emergency piston means and a pair of spaced walls having said vent chamber therebetween, said housing also having therein an emergency piston chamber in which said emergency piston means is operable and formed in part by a portion of said brake pipe pressure chamber located between said emergency piston means and one of the paired walls, said paired walls having substantially aligned openings therein of an emergency venting flow capacity connecting said brake pipe pressure chamber with said vent chamber and located substantially on the axis of said piston means, a balanced valve controlling said openings, said paired walls and the adjacent ends of said balanced valve having paired cooperating annular seating elements thereon and one of the annular seating elements of each pair of said seating elements being yieldable in character, spring means acting to urge said valve toward its closed position, and means providing an operating connection for opening actuation of said valve by said piston in opposition to said spring.

17. In an air brake vent valve mechanism, a housing having walls defining a vent chamber and a brake pipe pressure chamber and including movable service and emergency pistons and a pair of spaced walls having said vent chamber therebetween, said housing also having service and emergency piston chambers therein in which said service and emergency pistons are operable and formed in part by portions of said brake pipe pressure chamber which are located between said pistons and the paired walls, said paired walls having substantially aligned openings therein connecting said brake pipe pressure chamber with said vent chamber, a balanced valve controlling said openings and having seating portions engaging said walls when said valve is in its closed position, and means providing an operating connection between said valve and emergency piston for actuation by the latter.

18. In air brake vent valve mechanism, a housing having walls defining service and emergency piston chambers, service and emergency pistons operable in said service and emergency piston chambers and dividing said chambers into a brake pipe pressure compartment and a second pressure compartment, said walls including a pair of spaced walls defining a vent chamber between said piston chambers and said spaced walls having substantially aligned openings therein connecting the brake pipe pressure compartments of said piston chambers directly with said vent chamber, a balanced valve controlling said openings and having seating portions engaging said walls when said valve is in its closed position, spring means disposed between said service piston and said valve and yieldingly holding the latter in its closed position, and means providing a lost-motion operating connection between said emergency piston and said valve for imparting opening movement to the latter in opposition to said spring means.

19. In air brake apparatus, a housing having walls defining service and emergency piston chambers, service and emergency pistons operable in said service and emergency piston chambers and dividing said chambers into a brake pipe pressure compartment and a second pressure compartment, said walls including a pair of spaced walls defining a vent chamber between said piston chambers and said spaced walls having substantially aligned openings therein connecting the brake pipe pressure compartments of said piston chambers directly with said vent chamber, a balanced valve controlling said openings and having seating portions engaging said walls when said valve is in its closed position, a valve seat in said housing on the remote side of said service piston, stem means carried by said service piston and having a valve member at its remote end for cooperation with said valve seat, a spring disposed between the adjacent end of said stem means and said balanced valve, and means providing an operating connection between said emergency piston and said balanced valve for imparting opening movement to the latter in opposition to said spring.

20. In an air brake apparatus, a housing having walls defining service and emergency piston chambers, service and emergency pistons operable in said service and emergency piston chambers substantially on a common piston axis and dividing said chambers into a brake pipe pressure compartment and a second pressure compartment, said walls including a pair of spaced walls defining a vent chamber between said piston chambers and said spaced walls having openings therein located substantially on said piston axis and connecting the brake pipe pressure compartments of said piston chambers directly with said vent chamber, annular valve seats carried by said spaced walls and surrounding said openings, a balanced valve of substantially hourglass shape disposed on said axis and extending into said vent chamber through one of said openings, said valve having annular seating portions thereon adjacent its opposite ends and engageable with said valve seats when said valve is in its closed position, a spring disposed between said service piston and said balanced valve and urging the latter toward its closed position, and means providing an operating connection between said emergency piston and said valve for imparting opening movement to the latter in opposition to said spring.

21. In an air brake apparatus, a housing having walls defining service and emergency piston chambers, service and emergency pistons operable in said service and emergency piston chambers substantially on a common piston axis and dividing said chambers into a brake pipe pressure compartment and a second pressure compartment, said walls including a pair of spaced walls defining a vent chamber between said piston chambers and said spaced walls having openings therein located substantially on said piston axis and connecting the brake pipe pressure compartments of said piston chambers directly with said vent chamber, annular valve seats carried by said spaced walls and surrounding said openings, a balanced valve of substantially hourglass shape disposed on said axis and extending into said vent chamber through one of said openings, said valve having annular seating portions thereon adjacent its opposite ends and engageable with said valve seats when said valve is in its closed position, said service piston having a hollow stem located substantially on said axis, another valve seat in said housing adjacent the outer end of said hollow stem and located substantially on said axis, actuating stem means extending through and slidable in said hollow stem, a second valve carried by the outer end of said actuating stem means and engageable with said other valve seat, a spring disposed between the inner end of said actuating stem means and said balanced valve, and means providing an operating connection between said emergency piston and said balanced valve for imparting opening movement to the latter in opposition to said spring.

22. In an air brake apparatus, a housing having walls defining service and emergency piston chambers, service and emergency pistons operable in said service and emergency piston chambers substantially on a common piston axis and dividing said chambers into a brake pipe pressure compartment and a second pressure compartment, said walls including a pair of spaced walls defining a vent chamber between said piston chambers and said spaced walls having openings therein located substantially on said piston axis and connecting the brake pipe pressure compartments of said piston chambers directly with said vent chamber, annular valve seats carried by said spaced walls and surrounding said openings, a balanced valve of substantially hourglass shape disposed on said axis and extending into said vent chamber through one of said openings, said valve having annular seating portions thereon adjacent its opposite ends and engageable with said valve seats when said valve is in its closed position, said service piston having a hollow stem located substantially on said axis, another valve seat in said housing adjacent the outer end of said hollow stem and located substantially on said axis, actuating stem means extending through and slidable in said hollow stem, a second valve carried by the other end of said actuating stem means and engageable with said other valve seat, said hollow stem having an air passage therein and a third valve seat surrounding said air passage and located on the inner end of said hollow stem, a third valve carried by said actuating stem means and engageable with said third valve seat for controlling said air passage, a spring disposed between the inner end of said actuating stem means and said balanced valve, and means providing an operating connection between said emergency piston and said balanced valve for imparting opening movement to the latter in opposition to said spring.

23. In air brake apparatus, a piston having a stem and a passage in said stem extending from one side to the other of said piston, and a check valve member formed of yieldable material and controlling said passage, said check valve member having a transverse wall portion engaging said stem for mounting said valve member thereon and an annular lip portion sealingly engaging said piston in surrounding relation to one end of said passage.

24. In air brake apparatus, means defining a piston chamber, a diaphragm piston operable in said chamber and including a piston body and a stem extending through said piston body and having a passage therein, and a check valve member carried by said stem and controlling said passage, said check valve member comprising a cup shaped body of yieldable material disposed in overlying relation to one end of said passage and having an annular lip sealingly pressed against said piston body.

25. In an air brake mechanism of the character described, a housing having walls defining a brake pipe pressure chamber and a piston chamber and including a pair of walls having a vent chamber therebetween, a piston operable in said piston chamber and dividing the same into compartments one of which is in communication with said brake pipe pressure chamber and the other of which is adapted to be supplied with piston-actuating pressure, said piston having a relief passage therein for conducting piston-actuating pressure from said other compartment to said one compartment, a check valve carried by said piston and controlling said relief passage and adapted to open toward said one compartment, means effective to retard the discharge of piston-actuating pressure through said relief passage, said pair of walls having openings therein connecting said brake pipe pressure chamber with said vent chamber, a normally closed balanced valve controlling said openings, and means providing an operating connection for opening actuation of said balanced valve by said piston.

26. In an air brake mechanism of the character described, a housing having walls defining a brake pipe pressure chamber and a piston chamber and including a pair of walls having a vent chamber therebetween, a piston operable in said piston chamber and dividing the same into compartments one of which is in communication with said brake pipe pressure chamber and the other of which is adapted to be supplied with piston-actuating pressure, said piston having a stem containing a relief passage for conducting piston-actuating pressure from said other compartment to said one compartment, a check valve carried by said piston and controlling said relief passage and adapted to open toward said one compartment, means cooperating with said stem to retard the discharge of piston-actuating pressure through said relief passage, said pair of walls having openings therein connecting said brake pipe pressure chamber with said vent chamber and located substantially on the axis of said piston, a balanced valve controlling said openings, spring means urging said balanced valve toward closed position, and means providing an operating connection for opening actuation of said balanced valve by said piston.

27. In an air brake mechanism of the character described, a housing having walls defining a brake pipe pressure chamber and a piston chamber and including a pair of walls having a vent chamber therebetween, a piston operable in said piston chamber and dividing the same into compartments one of which is in communication with said brake pipe pressure chamber and the other of which is adapted to be supplied with piston-actuating pressure, said piston having a stem containing a relief passage for conducting piston-actuating pressure from said other compartment to said one compartment, said stem forming an axial projection on one side of said piston, a check valve controlling said passage and comprising a cup member of resilient material mounted on said axial projection and having an annular lip yieldingly pressed against said piston, said pair of walls having openings therein connecting said brake pipe pressure chamber with said vent chamber and located substantially in alignment with said projection, and a balanced valve controlling said openings and engageable by said projection for opening actuation by said piston.

28. In an air brake vent valve mechanism, a housing having walls including a first pair of spaced walls defining therebetween a brake pipe pressure chamber and a second pair of spaced walls located between the first pair of walls and defining a vent chamber, piston means operable in said brake pipe pressure chamber, the walls of said second pair having openings therein connecting said brake pipe pressure chamber with said vent chamber, a balanced valve controlling said openings and having end portions adapted for seating engagement with the walls of said second pair when the valve is in its closed position, and means providing an operating connection between said piston means and said valve for actuation of the latter.

29. In an air brake vent valve mechanism, a housing having walls including a first pair of spaced walls defining a brake pipe pressure chamber and a second pair of spaced walls located between the first pair of walls and defining a vent chamber, piston means operable in said brake pipe pressure chamber, the walls of said second pair having openings therein connecting said brake pipe pressure chamber with said vent chamber, a balanced valve controlling said openings and having end portions adapted for seating engagement with the walls of said second pair for closing said openings when the valve is in its closed position, and cooperating stem and shoulder means providing a lost-motion operating means adapted to cause opening actuation of said valve upon the occurrence of a predetermined movement of said piston means, said valve having an open position in which said ends are spaced from the walls of said second pair for a flow of fluid through said openings from said pressure chamber into said vent chamber.

References Cited in the file of this patent

UNITED STATES PATENTS

| Number | Name | Date |
|---|---|---|
| Re. 17,402 | Mitton | Aug. 13, 1929 |
| 467,921 | Coates | Feb. 2, 1892 |
| 526,187 | Guels | Sept. 18, 1894 |
| 599,348 | Noyes | Feb. 22, 1898 |
| 836,886 | Mann | Nov. 27, 1906 |
| 1,083,891 | Lipkowski | Jan. 6, 1914 |
| 1,089,574 | Neal | Mar. 10, 1914 |
| 1,520,166 | Wright | Dec. 23, 1924 |
| 2,035,063 | Glenn | Mar. 24, 1936 |
| 2,071,741 | Gnavi | Feb. 23, 1937 |
| 2,392,185 | Picker | Jan. 1, 1946 |
| 2,404,122 | Campbell | July 11, 1946 |
| 2,470,746 | Schultz | May 17, 1949 |